US012785333B2

(12) United States Patent
Gerber et al.

(10) Patent No.: US 12,785,333 B2

(45) Date of Patent: Nov. 3, 2026

(54) PLUG, PLUG CONNECTOR SYSTEM, PLUG KIT, AND METHOD FOR THE FIELD TERMINATION OF A CABLE WITH A PLUG

(71) Applicant: Reichle & De-Massari AG, Wetzikon (CH)

(72) Inventors: Matthias Gerber, Rüti (CH); Bernhard Hofer, Effretikon (CH); Marco Zurkirchen, Bubikon (CH)

(73) Assignee: Reichle & De-Massari AG, Wetzikon (CH)

( * ) Notice: Subject to any disclaimer, the term of this patent is extended or adjusted under 35 U.S.C. 154(b) by 615 days.

(21) Appl. No.: 18/259,240

(22) PCT Filed: Dec. 20, 2021

(86) PCT No.: PCT/EP2021/086721

§ 371 (c)(1),
(2) Date: Jun. 23, 2023

(87) PCT Pub. No.: WO2022/136233

PCT Pub. Date: Jun. 30, 2022

(65) Prior Publication Data

US 2024/0055810 A1 Feb. 15, 2024

(30) Foreign Application Priority Data

Dec. 23, 2020 (DE) ......................... 102020134894.0

(51) Int. Cl.

| | |
|---|---|
| ***H01R 13/6593*** | (2011.01) |
| ***H01R 4/2433*** | (2018.01) |
| ***H01R 13/717*** | (2006.01) |
| ***H01R 43/01*** | (2006.01) |

(52) U.S. Cl.

CPC ....... *H01R 13/6593* (2013.01); *H01R 4/2433* (2013.01); *H01R 13/7175* (2013.01); *H01R 43/01* (2013.01); *H01R 2201/04* (2013.01)

(58) Field of Classification Search

CPC ............ H01R 13/6593; H01R 13/6592; H01R 13/7175; H01R 2201/04; H01R 4/2433; H01R 43/01

USPC ............................... 439/607.41, 607.43, 344

See application file for complete search history.

(56) References Cited

U.S. PATENT DOCUMENTS 5,421,744 A 6/1995 Hio 6,932,640 B1 8/2005 Sung 8,033,863 B2 * 10/2011 Gutter ................ H01R 13/6589 439/620.07

(Continued)

OTHER PUBLICATIONS

Office Action received in related European application No. 21843618.6, mailed May 22, 2025, 17 pages.

(Continued)

*Primary Examiner* — Gary F Paumen

(74) *Attorney, Agent, or Firm* — Womble Bond Dickinson (US) LLP

(57) ABSTRACT

A plug, in particular a single-pair ethernet plug, has a plug unit for plugging into a corresponding plug socket unit along a plug-in direction and has a wiring block for receiving two conductor cores of a cable, wherein the wiring block is in an assembled state connected to the plug unit along an assembly direction, which is perpendicular to the plug-in direction.

14 Claims, 10 Drawing Sheets

(56) References Cited

U.S. PATENT DOCUMENTS

Figure 1:
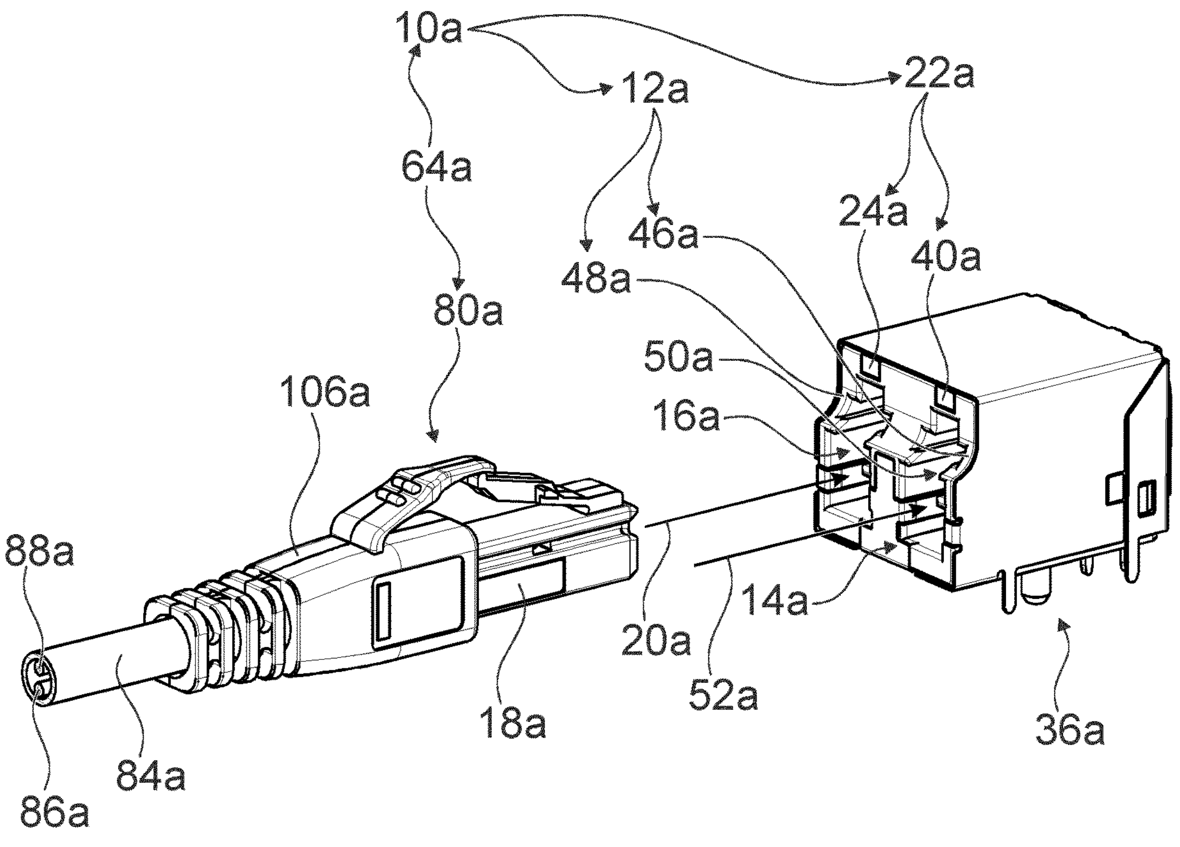

| | | | | |
|---|---|---|---|---|
| 8,992,257 | B2 * | 3/2015 | Ii | H01R 13/59 439/607.41 |
| 10,490,960 | B1 | 11/2019 | Wu | |
| 10,658,796 | B2 * | 5/2020 | Lüttermann | H01R 13/5837 |
| 2005/0277340 | A1 * | 12/2005 | Gordon | H01R 9/0512 439/676 |
| 2006/0205277 | A1 * | 9/2006 | Gordon | H01R 13/6599 439/607.41 |
| 2011/0104934 | A1 * | 5/2011 | Gutter | H01R 13/6589 439/620.01 |
| 2016/0336699 | A1 * | 11/2016 | Trio | H01R 13/4532 |
| 2018/0212360 | A1 | 7/2018 | Motohashi | |
| 2018/0323550 | A1 | 11/2018 | Brennan et al. | |

OTHER PUBLICATIONS

International Preliminary Report on Patentability for International Patent Application No. PCT/EP2021/086721, mailed Jun. 13, 2023, 16 pages.

International Search Report for International Patent Application No. PCT/EP2021/086721, mailed Jun. 1, 2022, 3 pages.

Search Report for German Patent Application No. DE 10 2020 134 894.0, mailed Dec. 23, 2020, 17 pages.

* cited by examiner

PLUG, PLUG CONNECTOR SYSTEM, PLUG KIT, AND METHOD FOR THE FIELD TERMINATION OF A CABLE WITH A PLUG

CROSS-REFERENCE TO RELATED APPLICATIONS

This patent application is based on and incorporates herein by reference the German patent application DE 10 2020 134 894.0, filed on Dec. 23, 2020, and the International patent application PCT/EP2021/086721, filed on Dec. 20, 2021.

PRIOR ART

The invention relates to a plug, a plug connector system, a plug kit and a method for the field termination of a cable with a plug.

Plugs with plug units for plugging into corresponding plug sockets and having wiring blocks to receive conductor cores are already known in the prior art. With the advent of single-pair ethernet connection techniques, which are supposed to provide in particular a suitable infrastructure for applications of the so-called Industrial Internet of Things (IIoT), new demands are also arising for the plugs which are to be used in such applications. First of all, plugs with particularly compact dimensions are required for many applications. What is more, novel applications increasingly require an installation on site. With the plugs known thus far, an installation of the wiring block is done along a plug-in direction or contrary to a plug-in direction, which is detrimental to the installation process.

The problem addressed by the invention is in particular to provide a plug of this kind having improved qualities in regard to the installation. The problem is solved according to the invention.

Benefits of the Invention

The invention starts from a plug, in particular a single-pair ethernet plug, having a plug unit for plugging into a corresponding plug socket unit along a plug-in direction and having a wiring block for receiving two conductor cores of a cable.

It is proposed that the wiring block is in an assembled state connected to the plug unit along an assembly direction, which is perpendicular to the plug-in direction.

Thanks to such a configuration, a plug having improved qualities in terms of installation can be provided advantageously. In particular, an especially simple, fast and at the same time especially reliable wiring of the switch can be accomplished when the wiring block is connected to the plug unit perpendicular to the plug-in direction. Moreover, an especially compact plug can be provided advantageously, which can be used advantageously also in applications with limited space, such as server rooms having many plugs arranged close to each other.

Advantageously, the plug constitutes at least a part, in particular a subassembly, of a plug connector system. Preferably, the plug connector system moreover comprises at least one plug socket, which comprises the corresponding plug socket unit for plugging in the plug unit along the plug-in direction. The plug can comprise the cable. However, the cable can also be part of the plug connector system or be configured as an accessory part formed independently of the plug connector system.

The wiring block is provided for the wiring of the plug. In the assembled state, the wiring block connects the two conductor cores of the cable in an electrically conductive manner to the plug unit, in particular to corresponding plug contacts of the plug unit. The two conductor cores of the cable could be connected inseparably to the plug unit by means of the wiring block in the assembled state, for example, by soldering or crimping. Preferably, the two conductor cores of the cable are connected separably to the wiring block in the assembled state. For example, the two conductor cores of the cable could be separably connected to the plug unit in the assembled state by means of an Insulation Displacement Contact (IDC) connection, wherein the conductor cores are each pressed individually by means of the wiring block along with the insulation into a so-called cutting terminal in the plug unit so that the insulation is cut through and an electrically conducting connection of the conductor cores to the plug contact of the plug unit is produced. Alternatively, the two conductor cores of the cable could be separably connected to the plug unit by means of a so-called Insulation Piercing Contact (IPC), wherein the insulation piercing contact comprises at least one spike, which in the assembled state is pierced through the insulation of the conductor core, in particular by inserting the wiring block into the plug unit, such that an electrically conductive connection of the conductor cores to the plug contact of the plug unit is produced. Preferably, the plug-in direction runs parallel to a principal direction of extension of the plug unit. Preferably, the assembly direction runs perpendicular to the principal direction of extension of the plug unit. By a “principal direction of extension” of an object shall be meant a direction which runs parallel to the longest edge of the smallest geometrical cuboid that only just completely encloses the object.

In the present application, ordinal words such as “first” and “second”, placed before certain terms, serve merely for a distinguishing of objects and/or for a ranking among objects and do not imply any existing total number and/or ranking of the objects. In particular, a “second object” does not necessarily imply the presence of a “first object”.

By “provided” shall be meant in particular designed and/or configured. The fact that an object is provided for a particular function shall be understood to mean that the object fulfills and/or performs this particular function in at least one application and/or operating state.

It is further proposed that the plug unit has a receiving space for receiving the wiring block, which is open contrary to the assembly direction and contrary to the plug-in direction, in particular to the surroundings and in particular in a disassembled state. In this way, the installation can advantageously be further improved.

Preferably, the plug contacts of the plug unit are arranged in the receiving space and oriented at least contrary to the assembly direction.

It is furthermore proposed that the wiring block is in the assembled state situated at least to a large extent inside the plug unit and in particular in the receiving space. Thanks to such a configuration, an especially compact plug can be provided advantageously. Such a compact plug is in particular advantageously suitable for applications with limited space, for example in server rooms having many plugs arranged close to each other. Preferably, the wiring block in the assembled state is situated at least to a large extent by 75% of its volume, in particular at least to a large extent by 80% of its volume, advantageously at least to a large extent by 85% of its volume, especially advantageously at least to a large extent by 90% of its volume, preferably at least to a large extent by 95% of its volume, inside the plug unit and in particular in the receiving space. Especially preferably, the wiring block in the assembled state is arranged entirely inside the plug unit.

Furthermore it is proposed that the plug comprises a plug shielding unit, which in the assembled state surrounds the plug unit at least section-wise, in particular with respect to the plug-in direction in the circumferential direction. In this way, a shielding of the plug can be advantageously achieved with simple technical means. In particular, a plug can be provided with advantageous qualities in terms of electromagnetic compatibility. Preferably, the plug shielding unit is designed to reduce, and preferably minimize, the transmission of electrical and/or electromagnetic, in particular high-frequency, interference signals from the surroundings to the conductor cores or from the conductor cores to the surroundings, in particular to nearby electrical and/or electronic devices in the vicinity.

Furthermore it is proposed that the plug shielding unit comprises a plug shielding element and a plug shielding flap which is pivotably connected to the plug shielding element and which is pivotable relative to the plug shielding element around a pivot axis running parallel to the plug-in direction. In this way, the installation can be advantageously improved. Preferably, the plug shielding flap is formed as a single piece with the plug shielding element. In this way, the number of transition sites in the plug shielding unit can advantageously be minimized, so that the reliability of the shielding can further be advantageously enhanced. Moreover, an especially low transfer impedance of the plug shielding unit can be achieved advantageously and thus a plug can be provided with improved qualities in terms of electromagnetic compatibility. By "single piece" is meant at least materially bonded, for example by a soldering process, and especially advantageously molded in a single piece.

The plug shielding element and the plug shielding flap could be firmly joined together, for example soldered, in an assembled state. In one advantageous embodiment, however, it is proposed that in the assembled state the plug shielding element and the plug shielding flap are snapped together with each other and/or with a plug housing of the plug unit. In this way, the installation can advantageously be further improved. Moreover, the plug shielding unit can be opened if necessary in an advantageously especially easy manner without the use of tools, for example, in order to replace a cable or the like. The plug shielding flap could have a snap element, which in the assembled state is snapped directly to a mating snap element on the plug shielding element. Preferably, the plug shielding element has a first snap element, which in the assembled state is snapped directly to a first mating snap element of the plug housing and the plug shielding flap advantageously has a second snap element, which in the assembled state is snapped directly to a second mating snap element of the plug housing, in particular in such a way that the plug shielding flap and the plug shielding element are indirectly snapped to each other.

Furthermore it is proposed that the plug shielding unit comprises two contacting tabs, which are provided for engaging around the cable and for crimping. In this way, a contacting of the plug shielding unit with the cable can be advantageously achieved with simple technical means. Preferably, the contacting tabs are provided for a contacting of the plug shielding unit with the cable. Preferably, the contacting tabs are furthermore provided for a strain relief of the cable. Thus, advantageously, a contacting of the cable with the plug shielding unit can be combined with a strain relief of the cable. Moreover, a strain relief of the cable can be advantageously achieved. However, alternatively or additionally, it would also be conceivable for the plug to have a strain relief, being configured as a component separate from the plug shielding unit.

Furthermore it is proposed that the plug comprises a cable kink protection, which is at least substantially closed in the circumferential direction with respect to the plug-in direction and which ensures a connection of the wiring block to the plug unit in the assembled state and in particular a connection of the plug shielding unit to the plug unit. Thanks to such a configuration, a plug having a multifunctional cable kink protection can be advantageously provided. The cable kink protection on the one hand advantageously protects the cable effectively against damage due to kinking and on the other hand it secures the connections of the plug unit to the wiring block and to the plug shielding unit. The cable kink protection is preferably configured separately from the plug unit and/or the plug shielding unit. The cable kink protection is provided in particular to receive at least the cable connected to the plug unit, in particular across the wiring block, and to protect it in particular against excessive strain, in particular a kinking, an excessive bending, and/or a tensile stress. Preferably, the cable kink protection has a cable protection section for this, which advantageously comprises at least one entrance opening for the cable and at least one exit opening for the cable, preferably oriented parallel to the entrance opening. Preferably, the cable kink protection is furthermore movable at least partly and/or at least for a portion in a direction deviating from the principal direction of extension of the plug unit. In particular, the cable kink protection establishes a minimum bending radius for the cable.

Furthermore it is proposed that the cable kink protection comprises at least one connection element for connection to a coding element. Thanks to such a configuration, a coding of the plug can be achieved advantageously with simple technical means. At the same time, the functionality of the cable kink protection can advantageously be further enhanced. Preferably, the connection element is provided for a detachable connection to the coding element, in particular without the need for tools. In this way, the flexibility can be advantageously enhanced, in particular because different coding elements can be connected especially quickly, easily, and suitably to the cable kink protection. Preferably, the connection element is provided for a form-fitting and/or force-locking connection to the coding element, for example a clip connection and/or a plug-in connection and/or a latching connection and/or the like. The connection element can be configured to be part of an outer contour of the cable kink protection, for example a specially shaped region of a surface of the cable kink protection and/or a recess and/or an elevation and/or the like, without being limited to this. Preferably, the plug comprises the coding element. The coding element can be provided for a colored and/or a mechanical and/or an electrical or electronic coding, such as by means of RFID, without being limited to this.

In a further aspect of the invention, which can be considered in particular by itself or also in combination with further aspects of the invention, it is proposed that the plug comprises a plug shielding unit, which comprises a latch element for locking the plug unit with the plug socket unit and comprises an actuating element for unlocking the latch element, wherein the actuating element comprises an actuating tab and the latch element comprises a latching tab, which interact at least for an unlocking. If the plug comprises a plug shielding unit with a latch element, an especially compact plug can be provided advantageously. Furthermore, a manufacturing process for the plug can be simplified advantageously when the latch element is part of the plug shielding unit. Preferably, the actuating tab and the latching tab contact each other in form-fitting and/or force-locking manner along a force impact area. Preferably, the latch element comprises a latch hook, which is connected to the latching tab and latches to a bolt receiver of a plug socket corresponding to the plug unit for the locking of the plug unit. During the unlocking, the actuating tab preferably transmits a torque along the force impact area to the latching tab, so that the latching tab and thus the latch hook is moved out from the bolt receiver in the plug socket and the plug is released for the unlocking.

Moreover, it is proposed that the actuating tab is oriented parallel to the plug-in direction and the latching tab is oriented antiparallel to the plug-in direction. In this way, a plug with an improved locking mechanism can be advantageously provided. In particular, advantageously, the dilemma existing with plugs known thus far between an adequate holding force of the plug inside a plug socket, on the one hand, and a simple unmounting of the plug from the plug socket, on the other hand, can advantageously be solved if the actuating tab is oriented parallel to the plug-in direction and the latching tab antiparallel to the plug-in direction. The actuating tab extends preferably from a point of the plug shielding unit situated close to a closed end of the plug, parallel to the plug-in direction. The latching tab extends preferably from a point of the plug shielding unit situated close to an open end of the plug, antiparallel, that is, contrary to the plug-in direction. By a "closed end" is meant a region of the plug adjoined by the cable in the assembled state of the plug. By an "open end" of the plug is meant a region of the plug, in particular the plug unit, which is intended to be inserted into the corresponding plug socket unit. In plugs known thus far from the prior art, latch elements are either applied from a closed end, so that the locking is spontaneously released under strong axial pulling on the plug contrary to the plug-in direction, which may be detrimental in many applications, or the latch elements are applied from an open end, in which case a large deflection of an actuating element is required in order to achieve an adequate deflection of the latch element for an unlocking. By having a two-part locking and an actuating tab which is applied from the closed side and a latching tab which is applied from the open side, both a reliable locking and a simple unlocking can be advantageously achieved.

Furthermore it is proposed that the plug unit has a latch receiving space for receiving the latch element at least during the unlocking. In this way, an especially compact plug can be advantageously provided. Moreover, a jamming of the latch element can be advantageously prevented, thus making possible an especially reliable unlocking. Preferably, the latch receiving space is situated in a direction perpendicular to the plug-in direction beneath the latch element.

The invention moreover relates to a plug connector system having at least one plug according to one of the previously described embodiments and having at least one plug socket, which comprises the corresponding plug socket unit. Such a plug connector system is distinguished, among other things, in particular by the aforementioned advantageous qualities of the plug, in particular in regard to an easy assembly and the compact dimensions of the plug. Furthermore, the plug connector system can comprise a plurality of further plugs, which are configured in particular identical to or different from the plug, and corresponding further plug sockets for them.

The invention moreover relates to a plug kit for the field termination of a plug according to one of the previously described embodiments, having the plug unit, the wiring block and the plug shielding unit. Such a plug kit is advantageously suited to an especially simple and fast field termination of a plug.

Furthermore, a method is proposed for the field termination of a cable with a plug, by means of the plug kit, wherein the cable is connected to the wiring block and the wiring block is then connected to the plug unit along the assembly direction, which is perpendicular to the plug-in direction. By means of such a method, an especially simple, fast and reliable assembly can be advantageously made possible.

The plug according to the invention and the method for field termination of a cable with a plug according to the invention should not be limited to the above described application and embodiment. In particular, the plug according to the invention and the method for field termination of a cable with a plug according to the invention in order to fulfill a functionality described herein can have a number of individual elements, components, and units, as well as steps of the method, different from the number mentioned herein.

DRAWINGS

Further benefits will emerge from the following description of the figures. The drawings show eight exemplary embodiments of the invention. The drawings, the description, and the claims contain many features in combination. The person skilled in the art will advisedly consider the features even individually and combine them into further meaningful combinations.

Figure 2:
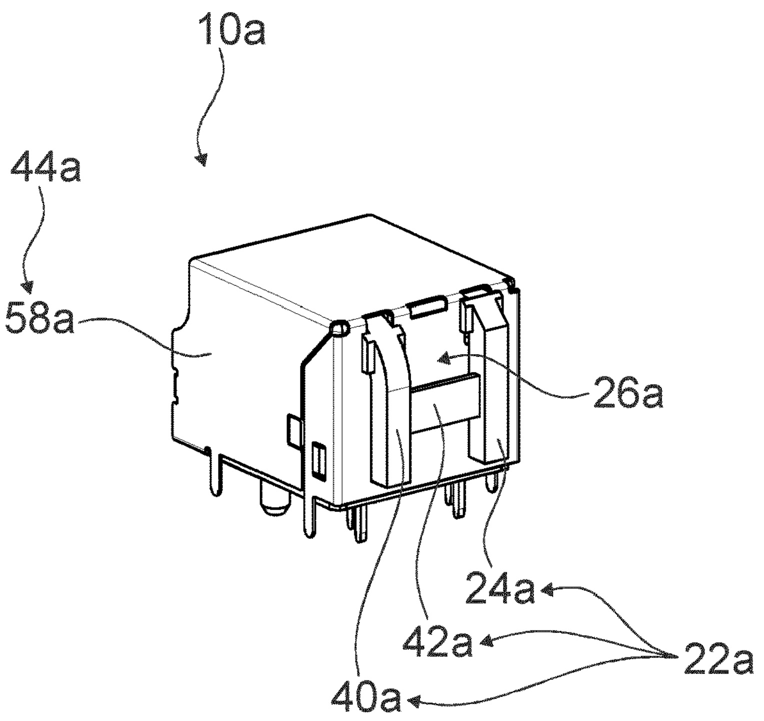
Figure 3:
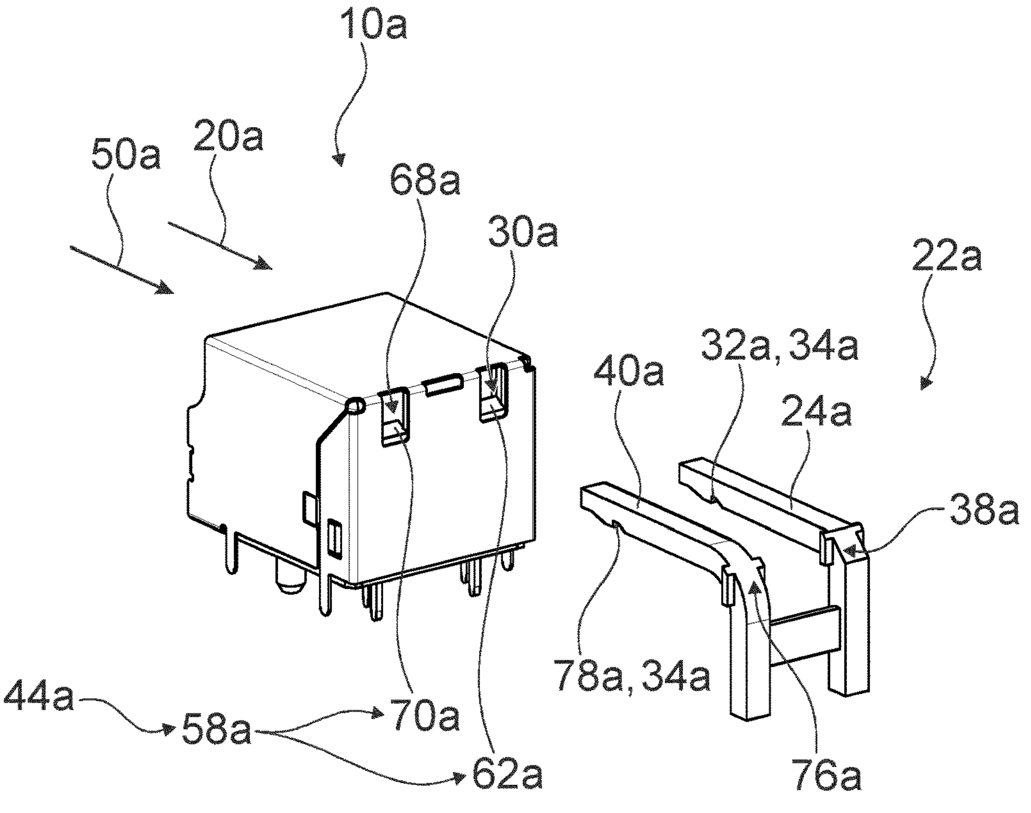
Figure 4:
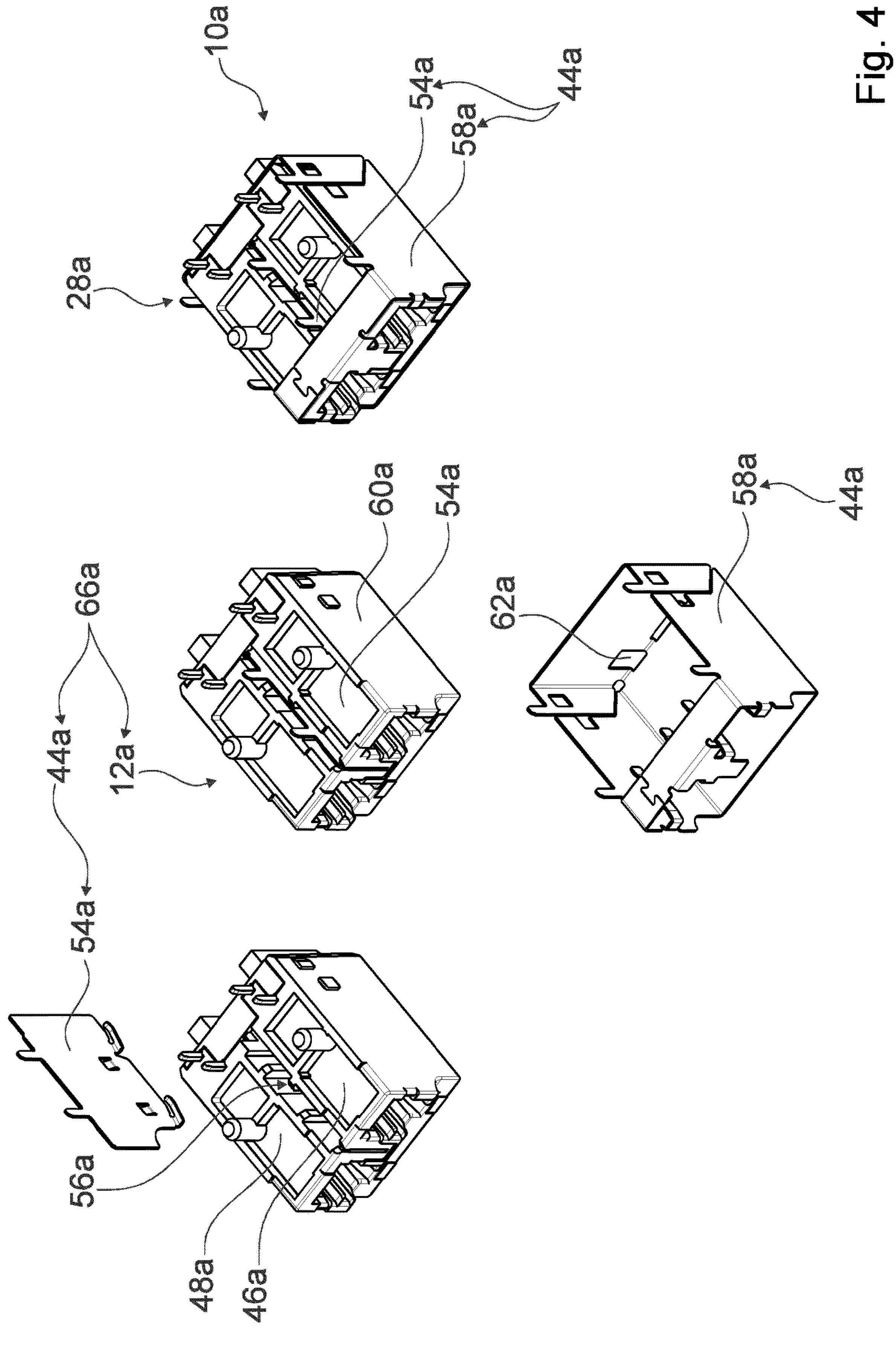
Figure 5:
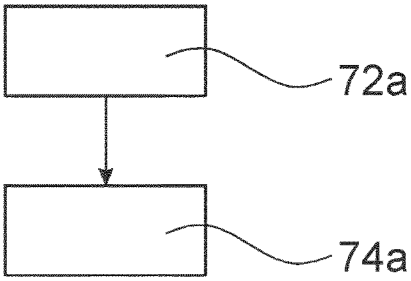
Figure 6:
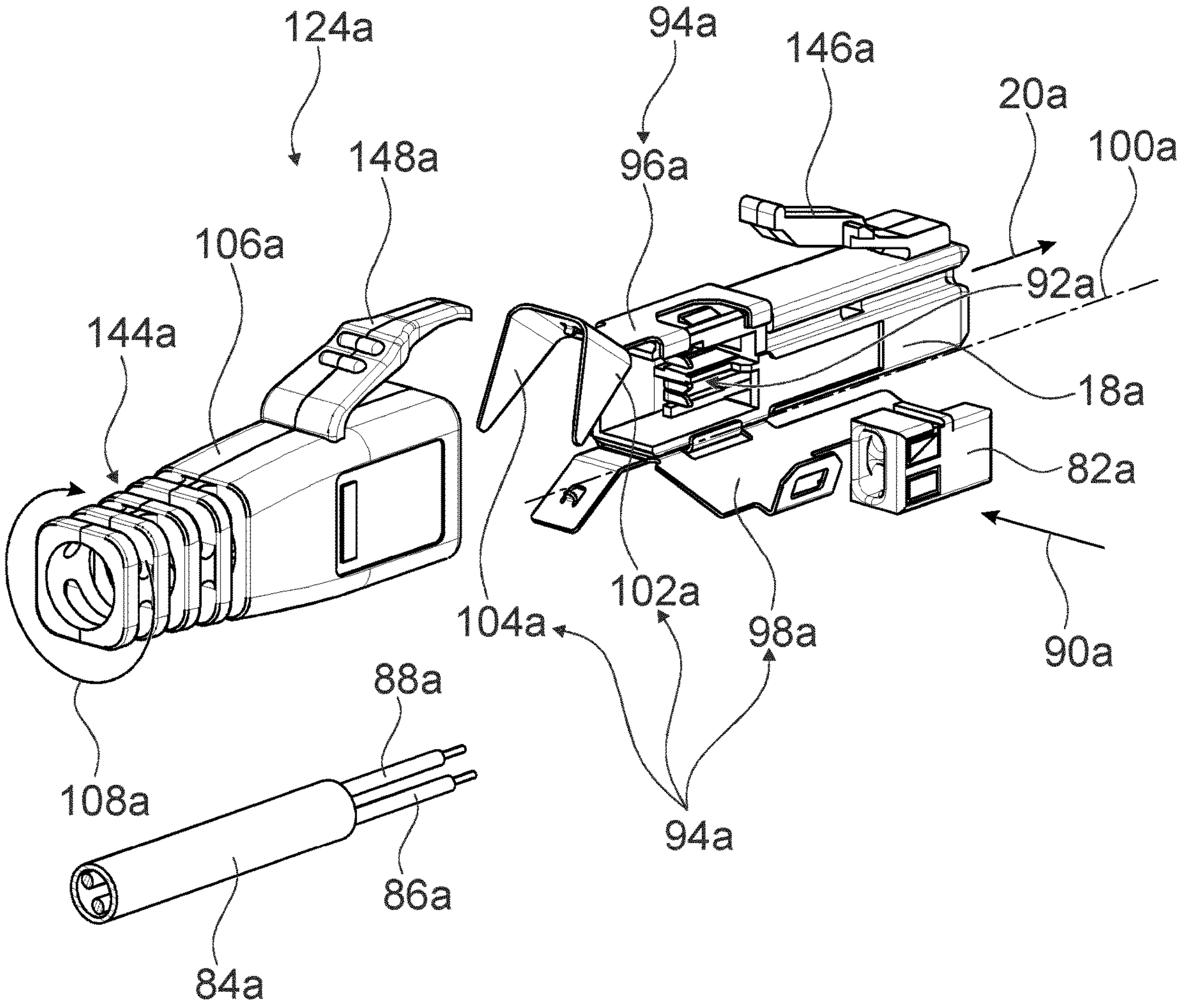
Figure 7:
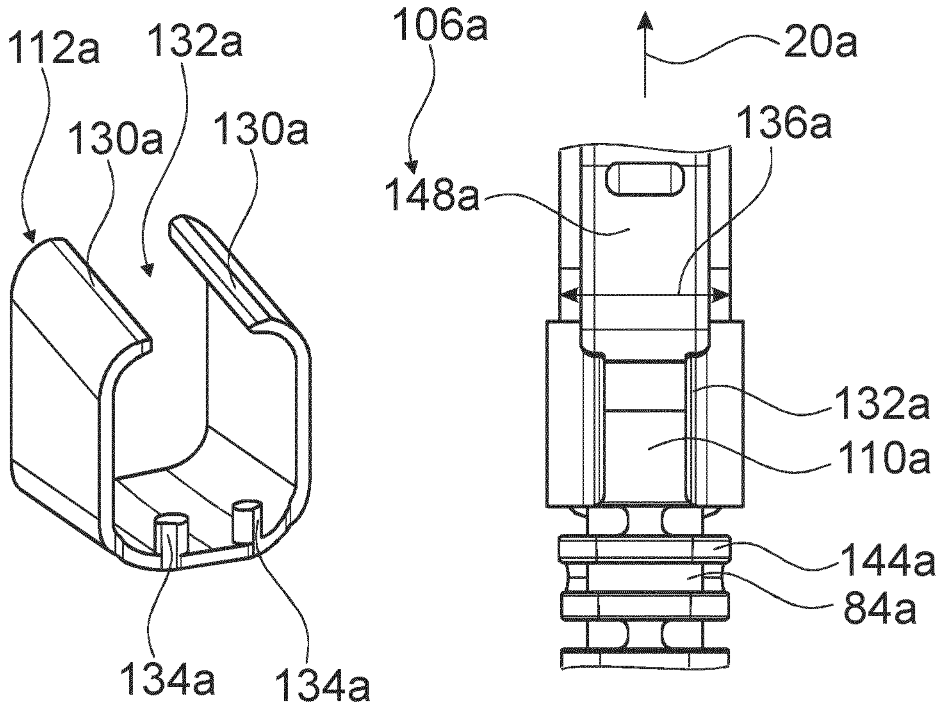
Figure 8:
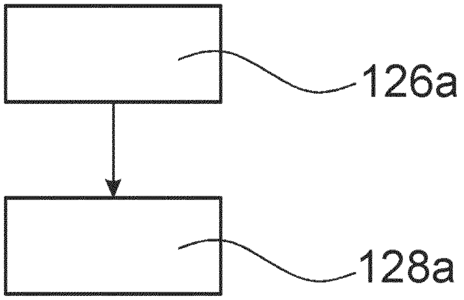
Figure 9:
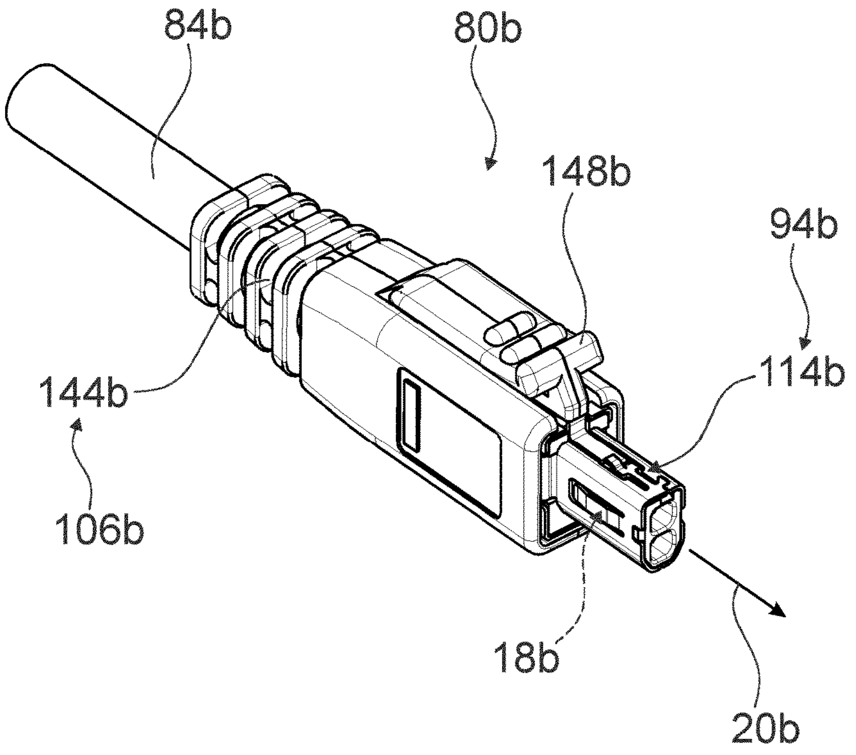
Figure 10:
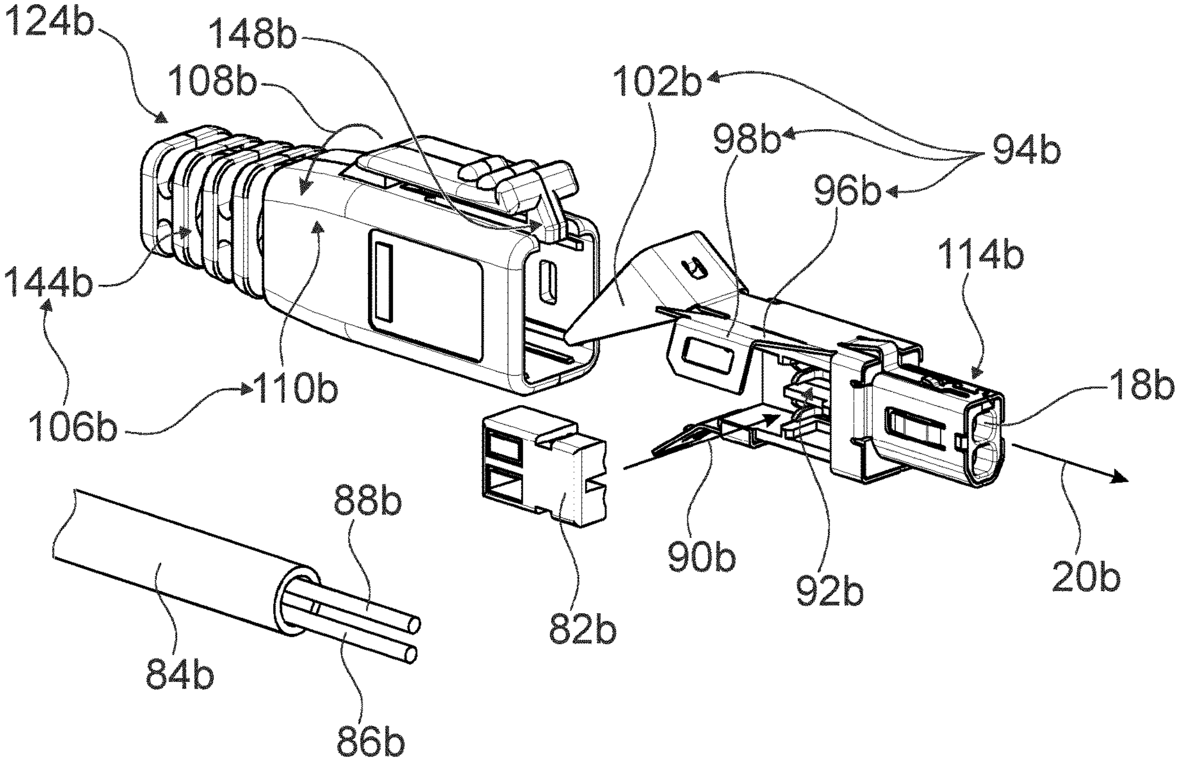
Figure 11:
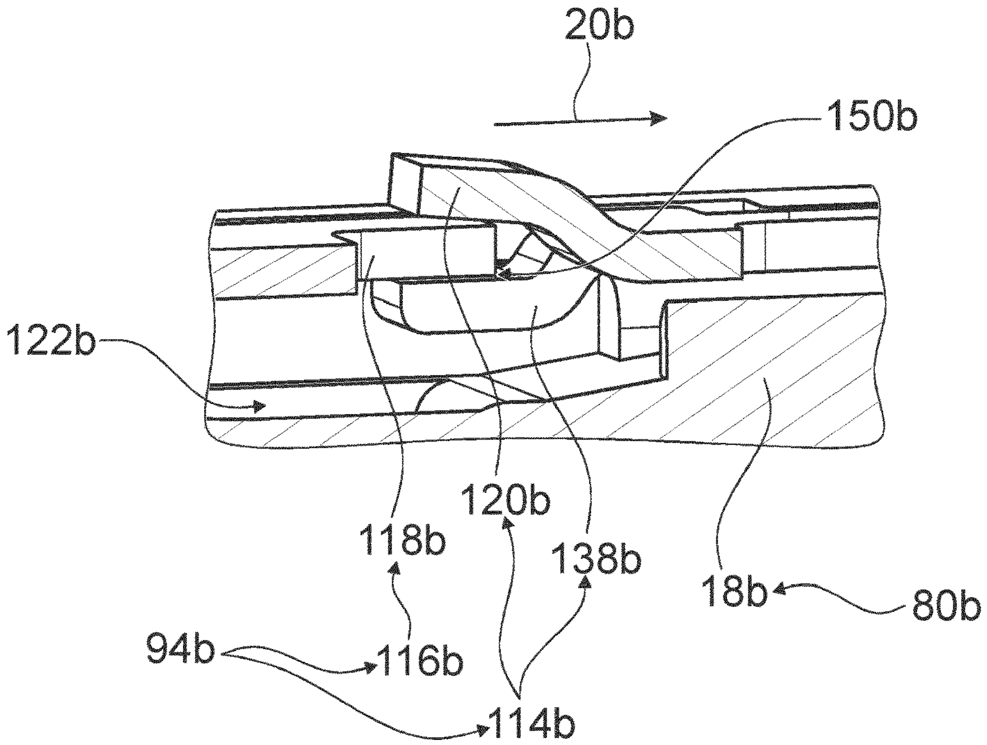
Figure 12:
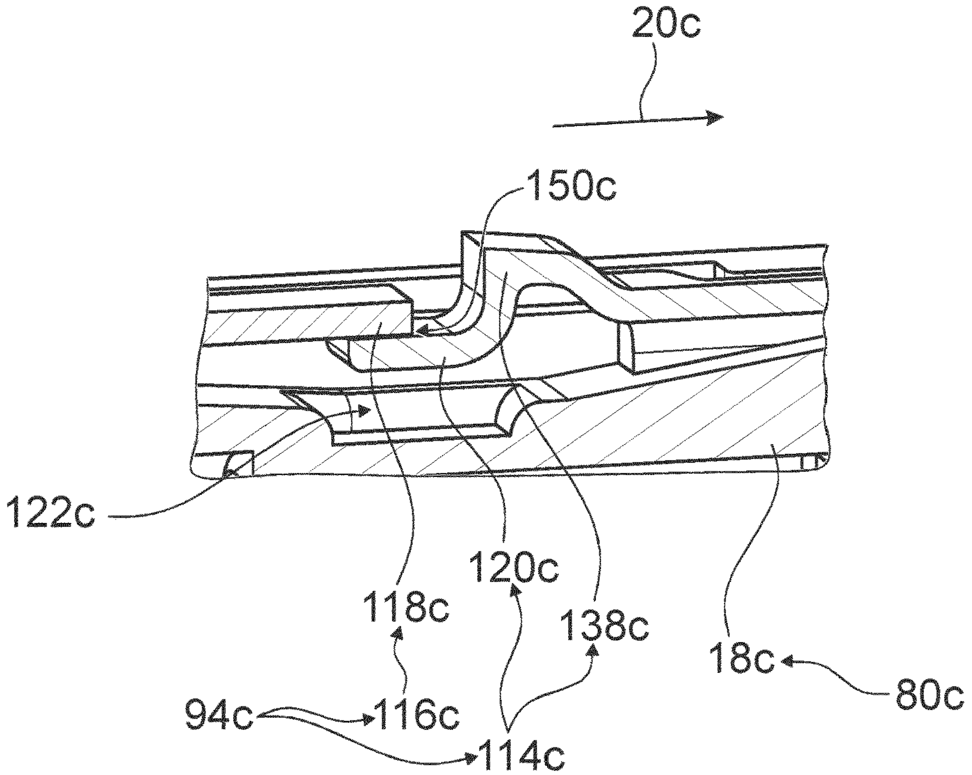
Figure 13:
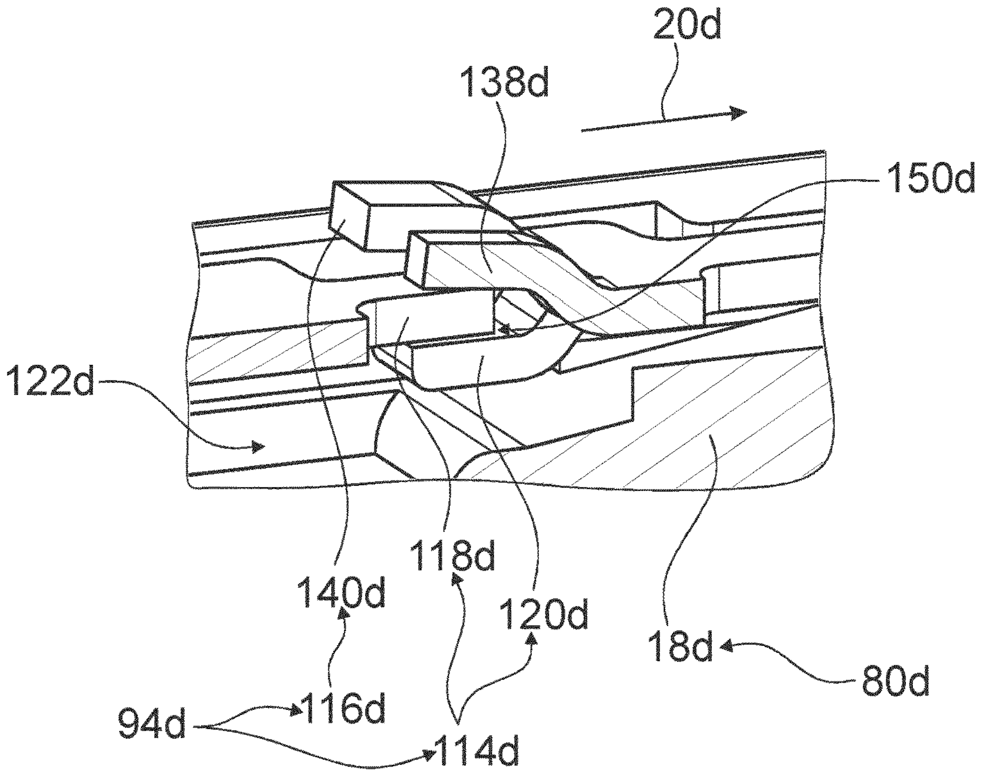
Figure 14:
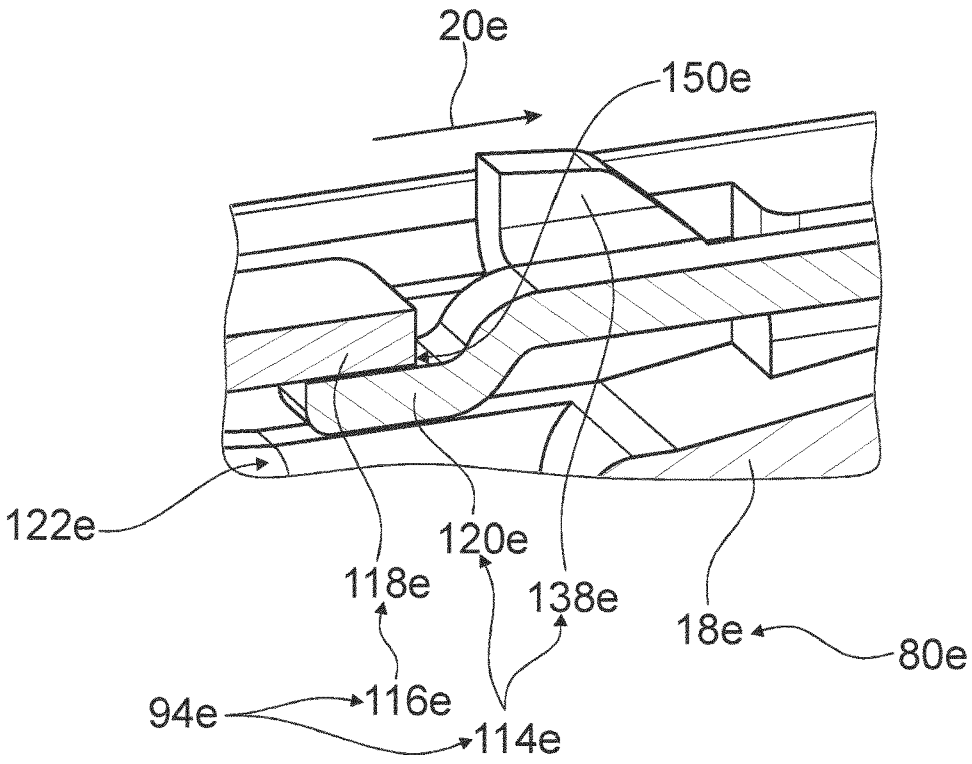
Figure 15:
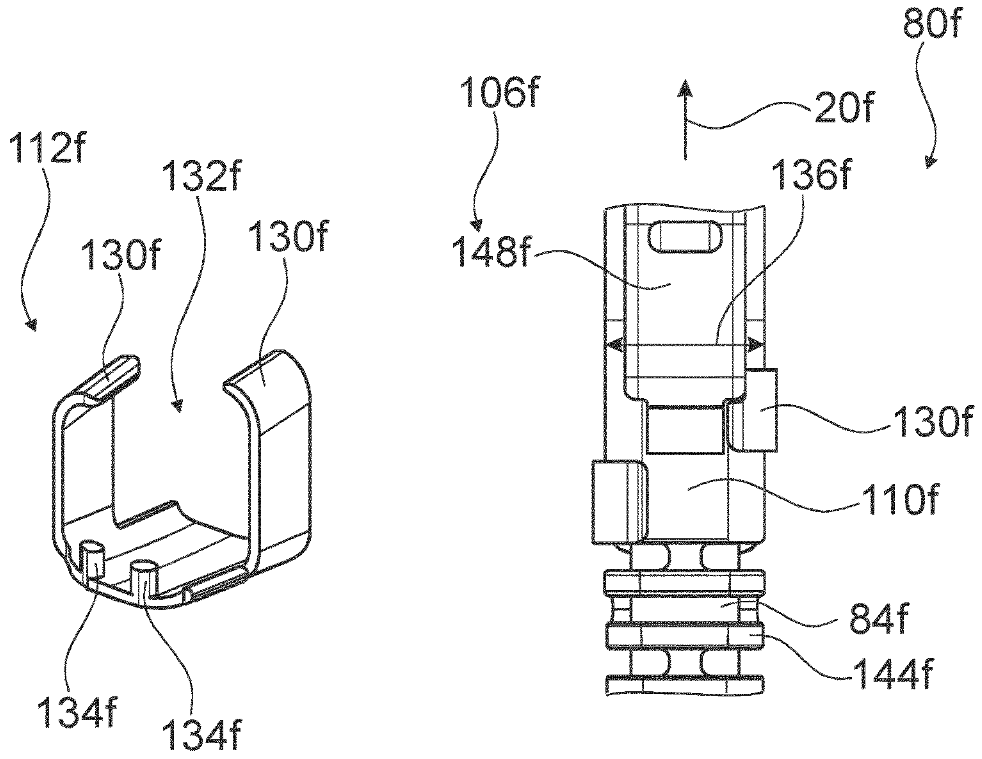
Figure 16:
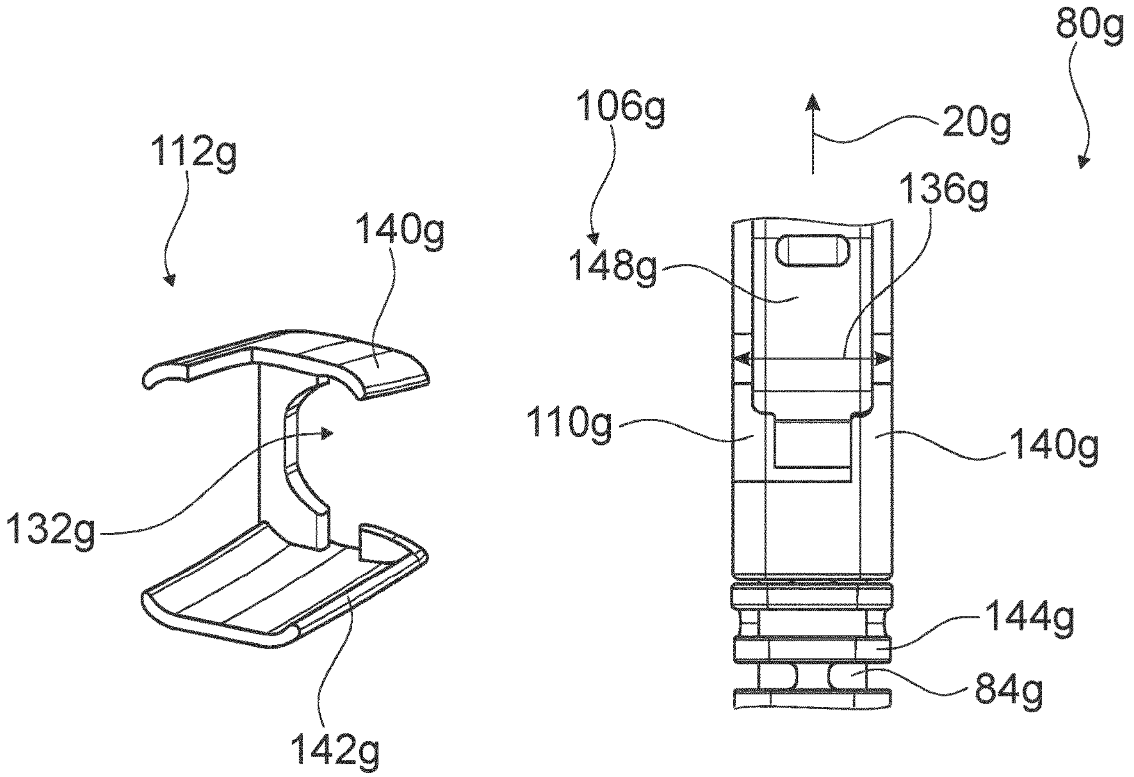
Figure 17:
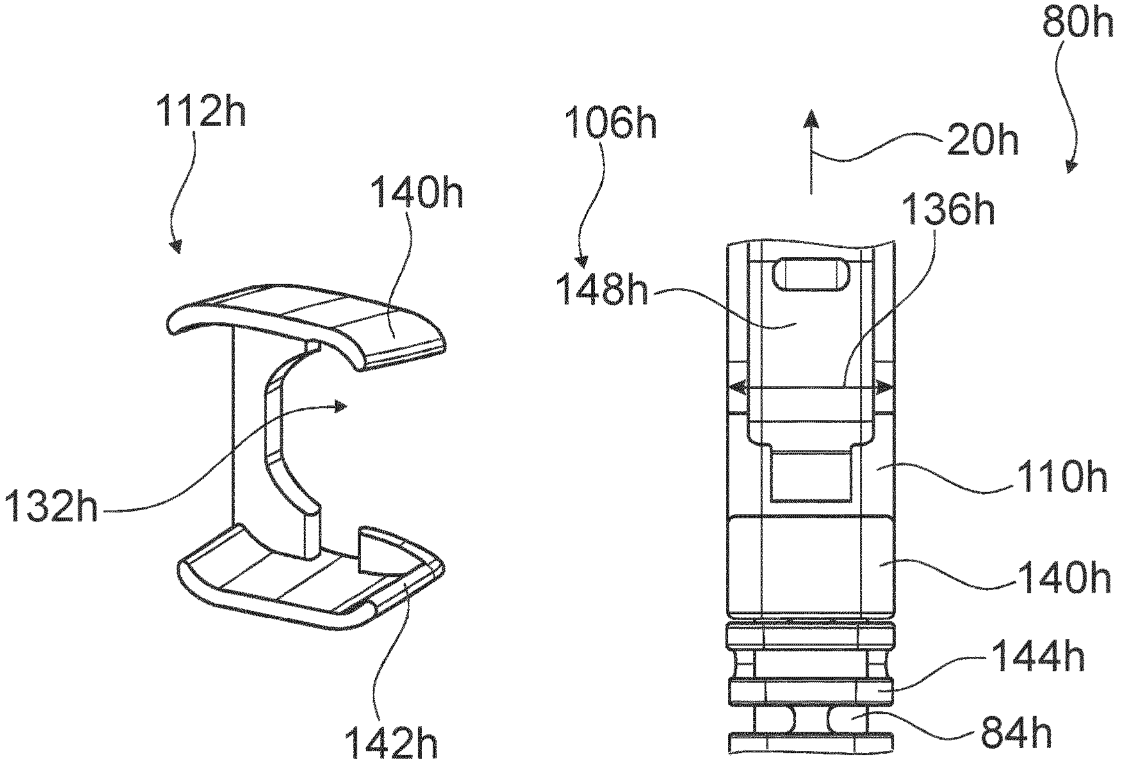

There are shown:

FIG. 1 a plug connector system with a plug socket and a plug in a schematic perspective representation, FIG. 2 the plug socket in a schematic representation, FIG. 3 the plug socket with an optical fiber in a schematic representation, FIG. 4 a plug socket kit for producing the plug socket, FIG. 5 a schematic method flow chart of a method for producing the plug socket with the plug socket kit, FIG. 6 a plug kit for the field termination of the plug, FIG. 7 a cable kink protection of the plug and a coding element in two schematic views, FIG. 8 a schematic method flow chart of a method for the field termination of a cable with the plug, FIG. 9 a further exemplary embodiment of a plug in a schematic perspective representation, FIG. 10 a plug kit for the field termination of the plug from the exemplary embodiment of FIG. 9, FIG. 11 a schematic cross-sectional representation through a plug unit and a plug shielding unit of the plug from the exemplary embodiment of FIG. 9, FIG. 12 a further exemplary embodiment of a plug with a plug unit and a plug shielding unit in a schematic cross-sectional representation, FIG. 13 a further exemplary embodiment of a plug with a plug unit and a plug shielding unit in a schematic cross-sectional representation, FIG. 14 a further exemplary embodiment of a plug with a plug unit and a plug shielding unit in a schematic cross-sectional representation, FIG. 15 a further exemplary embodiment of a plug with a cable kink protection and a coding element in two schematic views, FIG. 16 a further exemplary embodiment of a plug with a cable kink protection and a coding element in two schematic views and FIG. 17 a further exemplary embodiment of a plug with a cable kink protection and a coding element in two schematic views.

DESCRIPTION OF THE EXEMPLARY EMBODIMENTS

FIG. 1 shows a plug connector system 64*a*. The plug connector system 64*a* is designed as a single-pair ethernet plug connector system. The plug connector system 64*a* comprises a plug socket 10*a* and a plug 80*a*.

The plug socket 10*a* is designed as a single-pair ethernet plug socket. The plug socket 10*a* comprises a connection unit 36*a* for a connection to a circuit board (not shown). The plug socket 10*a* comprises a plug socket unit 12*a*. At a front side 14*a*, the plug socket unit 12*a* comprises a plug opening 16*a*. The plug opening 16*a* is provided to receive a corresponding plug unit 18*a* along a plug-in direction 20*a*. The plug socket unit 12*a* comprises a plug socket subunit 46*a*. The plug socket subunit 46*a* comprises the plug opening 16*a*. The plug socket unit 12*a* comprises a further plug socket subunit 48*a*. The further plug socket subunit 48*a* comprises a further plug opening 50*a*. The further plug opening 50*a* is provided to receive a further plug unit (not shown) along a further plug-in direction 52*a*. The further plug-in direction 52*a* is parallel to the plug-in direction 20*a*. The plug socket subunit 46*a* is made as a single piece with the further plug socket subunit 48*a*.

The plug 80*a* of the plug connector system 64*a* comprises the plug unit 18*a* corresponding to the plug opening 16*a*.

FIG. 2 shows the plug socket 10*a* in a schematic view. The plug socket 10*a* comprises a fiber optic unit 22*a*. The fiber optic unit 22*a* comprises at least one optical fiber 24*a*. The optical fiber 24*a* extends from a rear side 26*a* of the plug socket unit 12*a* to the front side 14*a* (see FIG. 1).

In the present instance, the fiber optic unit 22*a* comprises a further optical fiber 40*a*. The further optical fiber 40*a* extends likewise from the rear side 26*a* of the plug socket unit 12*a* to the front side 14*a* (see FIG. 1).

By means of the optical fiber 24*a* and/or the further optical fiber 40*a* of the fiber optic unit 22*a*, optical signals (not shown) can be transported in an operational state of the plug socket 10*a* from external signal sources (not shown), such as LEDs, which are mounted independently of the plug socket 10*a* on the circuit board, via the rear side 26*a* to the front side 14*a*, so that for example the operational state or a malfunction or the like can be indicated at the front side 14*a* of the plug socket 10*a*.

The fiber optic unit 22*a* comprises a connection web 42*a*. The connection web 42*a* connects the optical fiber 24*a* to the further optical fiber 40*a*. The connection web 42*a* is arranged between the optical fiber 24*a* and the further optical fiber 40*a* and is oriented basically perpendicular to the two optical fibers 24*a*, 40*a*.

FIG. 3 shows the plug socket 10*a* and the fiber optic unit 22*a* in a schematic representation. The plug socket unit 12*a* has at least one pass-through opening 30*a* to receive the optical fiber 24*a*. The pass-through opening 30*a* is situated at the plug socket subunit 46*a* of the plug socket unit 12*a*. The pass-through opening 30*a* extends from the rear side 26*a* to the front side 14*a* of the plug socket unit 12*a* and thus contrary to the plug-in direction 20*a*. In the present instance, the plug socket unit 12*a* has a further pass-through opening 68*a* to receive the further optical fiber 40*a*. The further pass-through opening 68*a* is situated at the further plug socket subunit 48*a*. The further pass-through opening 68*a* extends from the rear side 26*a* to the front side 14*a* and thus contrary to the further plug-in direction 52*a*.

The optical fiber 24*a* comprises a connection element 32*a* for a releasable connection to the plug socket unit 12*a*. In the present instance, the connection element 32*a* is configured as a catch element 34*a* and is provided for a latching to a mating locking element (not shown) of the plug socket unit 12*a*, situated in and/or at the pass-through opening 30*a*. The connection element 32*a* of the optical fiber 24*a* which is configured as the catch element 34*a* is configured in the present instance as a latching recess. The mating locking element situated inside the pass-through opening 30*a* is configured as a latching hook corresponding to the catch element 34*a*.

The further optical fiber 40*a* comprises a further connection element 78*a*. The further connection element 78*a* is configured as a catch element 34*a*, namely, as a latching recess, and it is designed to latch to a further mating locking element (not shown) situated in and/or at the further pass-through opening 68*a*. The further connection element 78*a* of the further optical fiber 40*a* is basically identical in configuration to the connection element 32*a* of the optical fiber 24*a*.

The optical fiber 24*a* has a deflection region 38*a* for the deflection of an optical signal (not represented). The deflection region 38*a* is configured as an angular surface inside the optical fiber 24*a*. The optical signal is deflected in the deflection region 38*a* by means of total reflection, similar to a periscope.

The further optical fiber 40*a* has a further deflection region 76*a*. By contrast with the deflection region 38*a* of the optical fiber 24*a*, the further deflection region 76*a* of the further optical fiber 40*a* has a radius and is curved, similar to a glass fiber.

FIG. 4 shows a plug socket kit 66*a* for producing the plug socket 10*a* in various schematic views. The plug socket kit 66*a* encompasses the plug socket unit 12*a*, the fiber optic unit 22*a* (see FIG. 3) and a plug socket shielding unit 44*a*. In a representation of FIG. 4 at the right side, the plug socket 10*a* is shown in an assembled state in a schematic view of an underside 28*a* of the plug socket unit 12*a*. The plug socket 10*a* comprises the plug socket shielding unit 44*a*. The plug socket shielding unit 44*a* comprises an inner shielding element 54*a* and an outer shielding element 58*a*. The inner shielding element 54*a* is arranged in the assembled state between the plug socket subunit 46*a* and the further plug socket subunit 48*a*. In a lefthand view of FIG. 4, the plug socket unit 12*a* and the inner shielding element 54*a* are shown schematically. The plug socket unit 12*a* has a shielding opening 56*a*. The shielding opening 56*a* is provided to receive the inner shielding element 54*a* of the plug socket shielding unit 44*a*. The shielding opening 56*a* is arranged between the plug socket subunit 46*a* and the further plug socket subunit 48*a*.

A middle view of FIG. 4 shows the plug socket unit 12*a* with the inner shielding element 54*a* arranged in the shielding opening 56*a*. The outer shielding element 58*a* in the assembled state covers at least the major portion of an outer side 60*a* of the plug socket unit 12*a*.

The outer shielding element 58*a* has at least one recess 62*a* for leading through the optical fiber 24*a*. In the present instance, the outer shielding element 58*a* has a further recess 70*a* (see FIG. 3) to lead through the further optical fiber 40*a*.

The recess 62*a* is situated in front of the pass-through opening 30*a*. The further recess 70*a* is situated in front of the further pass-through opening 68*a* (see FIG. 3).

FIG. 5 shows a schematic flow chart of a method for producing the plug socket 10*a* with the plug socket kit 66*a*. The method involves at least two steps of the method 72*a*, 74*a*. In a first step of the method 72*a*, the plug socket unit 12*a* is provided with the plug socket shielding unit 44*a*. First of all, the inner shielding element 54*a* is introduced into the shielding opening 56*a* of the plug socket unit 12*a* (see FIG. 4). Next, in the first step of the method 72*a*, the outer shielding element 58*a* is placed on the outer side 60*a* of the plug socket unit 12*a* and contacted with the inner shielding element 54*a* (see FIG. 4). In a second step of the method 74*a*, the fiber optic unit 22*a* is connected to the plug socket unit 12*a*. The optical fiber 24*a* in this process is led in through the recess 62*a* of the outer shielding element 58*a* into the pass-through opening 30*a* of the plug socket unit 12*a* from the rear side 26*a* and contrary to the plug-in direction 20*a* (see FIG. 3). At the same time, in the further step of the method 72*a*, the further optical fiber 40*a*, which is connected to the optical fiber 24*a* by the connection web 42*a*, is led in through the further recess 70*a* of the outer shielding element 58*a* into the further pass-through opening 68*a* of the plug socket unit 12*a*, contrary to the further plug-in direction 52*a* (see FIG. 3). Upon introducing the optical fiber 24*a* into the pass-through opening 30*a* of the plug socket unit, the connection element 32*a* fashioned as the catch element 34*a* is latched to the mating locking element. Likewise, upon introducing the further optical fiber 40*a* into the further pass-through opening 68*a*, the further connection element 78*a* fashioned as the catch element 34*a* is latched to the further mating locking element (see FIG. 3).

The plug 80*a* of the plug connector system 64*a* represented in FIG. 1 comprises the plug unit 18*a* for plugging into the corresponding plug socket unit 12*a* of the plug socket 10*a*.

The plug 80*a* comprises a wiring block 82*a* (see FIG. 6) for receiving two conductor cores 86*a*, 88*a* of a cable 84*a*. In an assembled state of the plug 80*a*, as represented in FIG. 1, the wiring block 82*a* is connected to the plug unit 18*a* along an assembly direction 90*a*, which is perpendicular to the plug-in direction 20*a*. The wiring block 82*a* in the assembled state is arranged at least to a large extent inside the plug unit 18*a*. In the present instance, the wiring block 82*a* is situated entirely in the plug unit 18*a*.

The plug 80*a* comprises a plug shielding unit 94*a* (see FIG. 6). In the assembled state, the plug shielding unit 94*a* surrounds the plug unit 18*a* at least for a portion.

FIG. 6 shows a plug kit 124*a* for the field termination of the plug 80*a*. In FIG. 6, the plug 80*a* is represented in a disassembled state. The plug kit 122*a* encompasses the plug unit 18*a*, the wiring block 82*a* and a plug shielding unit 94*a* of the plug 80*a* (see FIG. 1).

The plug unit 18*a* comprises a locking element 146*a*. The locking element 146*a* is provided for a locking of the plug unit 18*a* in the plug opening 16*a* of the plug socket 10*a* (see FIG. 1).

The plug unit 18*a* has a receiving space 92*a* to receive the wiring block 82*a*. The receiving space 92*a* is open toward the assembly direction 90*a* and toward the plug-in direction 20*a*, in particular to the surroundings and in particular in the disassembled state of the plug 80*a*, as represented in FIG. 6.

The plug shielding unit 94*a* comprises a plug shielding element 96*a* and a plug shielding flap 98*a*. The plug shielding flap 98*a* is pivotably connected to the plug shielding element 96*a*. The plug shielding flap 98*a* can pivot relative to the plug shielding element 96*a* about a pivot axis 100*a*. The pivot axis 100*a* runs parallel to the plug-in direction 20*a*.

The plug shielding unit 94*a* comprises two contacting tabs 102*a*, 104*a*. The contacting tabs 102*a*, 104*a* are provided for reaching around and crimping the cable. In the assembled state of the plug 80*a*, the contacting tabs 102*a*, 104*a* reach around the cable 84*a* and are crimped with it, so that the plug shielding unit 94*a* makes contact with the cable 84*a*. Furthermore, the contacting tabs 102*a*, 104*a* in the assembled state serve for a strain relief of the cable 84*a*.

The plug 80*a* comprises a cable kink protection 106*a* to protect the cable 84*a* against kinking. The cable kink protection 106*a* is at least substantially closed in a circumferential direction 108*a* with respect to the plug-in direction 20*a*. In the assembled state of the plug 80*a*, the cable kink protection 106*a* secures the connection of the wiring block 82*a* to the plug unit 18*a* as well as a connection of the plug shielding unit 94*a* to the plug unit 18*a*.

The cable kink protection 106*a* has a flexible region 144*a*. In the assembled state, the flexible region 144*a* surrounds the cable 84*a*, so that it can move flexibly.

The cable kink protection 106*a* comprises an unlocking element 148*a*. The unlocking element 148*a* is provided for unlocking the locking element 146*a* in a locked state of the plug unit 18*a* in the plug opening 16*a* of the plug socket 10*a* (see FIG. 1).

The cable kink protection 106*a* comprises a connection element 110*a*. The connection element 110*a* is provided for a connection to a coding element 112*a* (see FIG. 7). The connection element 110*a* is formed as a specially shaped outer contour of the cable kink protection 106*a* between the actuating element 148*a* and the flexible region 144*a*.

FIG. 7 shows the coding element 112*a* once in a schematic single view and once in connection with the cable kink protection 106*a*. The coding element 112*a* comprises two grab hooks 130*a* arranged opposite each other and in mirror symmetry, which are separated from each other by an opening 132*a*. The grab hooks 130*a* are elastically deformable. The coding element 112*a* comprises two pins 134*a*, which engage with appropriately shaped recesses (not shown) of the connection element 110*a* when connected to the cable kink protection 106*a*.

For a connection of the coding element 112*a* to the cable kink protection 106*a*, the two grab hooks 130*a* are pulled apart in opposite directions, so that the opening 132*a* widens to a width 136*a* of the cable kink protection 106*a*. After this, the coding element 112*a* is pushed onto the cable kink protection 106*a* from an underside. The grab hooks 130*a* thanks to their elasticity return to their starting position and reach around the connection element 110*a* of the cable kink protection 106*a* with form fit. In addition, the pins 134*a* of the coding element 112*a* engage with the recesses of the connection element 110*a*, so that a slipping of the coding element 112*a* in the direction of the flexible region of the cable kink protection 106*a* is prevented.

FIG. 8 shows a schematic flow chart of a method for the field termination of the cable 84*a* with the plug 80*a* by means of the plug kit 124*a*. The method involves at least two steps of the method 126*a*, 128*a*. In one step of the method 126*a*, the cable 84*a* is connected to the wiring block 82*a*. The two conductor cores 86*a*, 88*a* of the cable 84*a* are led into the wiring block 82*a* and an excess of the conductor cores 86*a*, 88*a* is cut off. Next, in a further step of the method 128*a*, the wiring block 82*a* is connected to the plug unit 18*a* along the assembly direction 90*a*. The wiring block 82*a* is inserted into the receiving space 92*a*, so that the conductor cores 86*a*, 88*a* of the cable 84*a* are connected to the plug contacts of the plug unit 18*a* by means of a separable insulation displacement connection.

In FIGS. 9 to 17, seven further exemplary embodiments of the invention are shown. The following descriptions and the drawings are limited basically to the differences between the exemplary embodiments, while regarding identically designated components, in particular in regard to components with the same reference numbers, one may refer basically to the drawings and/or the description of the other exemplary embodiments, in particular FIGS. 1 to 8. In order to distinguish the exemplary embodiments, the letter a is placed after the reference numbers of the exemplary embodiment in FIGS. 1 to 8. In the exemplary embodiments of FIGS. 9 to 17, the letter a is replaced by the letters b through h.

FIG. 9 shows a further exemplary embodiment of a plug 80*b* in a schematic view. The plug 80*b* differs from the plug 80*a* of the preceding exemplary embodiment in particular in regard to a connection type. The plug 80*b* is designed as a MSP plug. The plug 80*b* comprises a plug unit 18*b* for plugging into a corresponding plug socket (not shown) along a plug-in direction 20*b*.

The plug 80*b* comprises a wiring block 82*b* (see FIG. 10) for receiving two conductor cores 86*b*, 88*b* of a cable 84*b*. In an assembled state of the plug 80*b*, the wiring block 82*b* is connected to the plug unit 18*b* along an assembly direction 90*b*, which is perpendicular to the plug-in direction 20*b*. The wiring of the plug 80*b* by means of the wiring block 82*b* is done basically identical to the wiring of the plug 80*a* by means of the wiring block 82*a*, so that in this regard reference is made to the above description of the exemplary embodiment of FIGS. 1 to 6.

The plug 80*b* comprises a plug shielding unit 94*b*. In the assembled state of the plug 80*b*, the plug shielding unit 94*b* surrounds the plug unit 18*b* at least for a portion.

The plug shielding unit 94*b* comprises a latch element 114*b* for the locking of the plug unit 18*b* to a plug socket unit (not shown) and an actuating element 116*b*. The latch element 114*b* comprises a latching tab 120*b*. The actuating element 116*b* comprises an actuating tab 118*b*. The actuating element 116*b* and the latch element 114*b* interact at least for an unlocking.

FIG. 10 shows a plug kit 124*b* for the field termination of the plug 80*b* in a schematic view. A field termination of the plug 80*b* by means of the plug kit 124*b* is done basically similar to the previously described field termination of the plug 80*a* by means of the plug kit 124*a* of the previous exemplary embodiment.

FIG. 11 shows the plug unit 18*b* and the plug shielding unit 94*b* of the plug 80*b* in a schematic cross-sectional representation. The actuating tab 118*b* is oriented parallel to the plug-in direction 20*b*. The latching tab 120*b* is oriented antiparallel to the plug-in direction 20*b*. The actuating tab 118*b* contacts the latching tab 120*b* in form-fit and/or force-locking along a force impact area 150*b*. The latch element 114*b* comprises a latch hook 138*b*. In a locked state of the plug unit 18*b* with a corresponding plug socket (not shown), the latch hook 138*b* is locked to the plug socket. The latch hook 138*b* is connected to the latching tab 120*b* and arranged with an offset to the side relative to the latching tab 120*b* in the plug-in direction 20*b*.

The plug unit 18*b* has a latch receiving space 122*b* for receiving the latch element 114*b* at least during the unlocking.

The plug 80*b* comprises a cable kink protection 106*b* to protect a cable 84*b* (see FIG. 10). The cable kink protection 106*b* comprises an unlocking element 148*b*. For the unlocking, the actuating tab 118*b* is activated by pressing on the unlocking element 148*b*. A torque is then exerted by the actuating tab 118*b* on the latching tab 120*b* and the latching tab 120*b* is moved in the direction of the latch receiving space 122*b*. In this process, the latch hook 138*b* likewise moves in the direction of the latch receiving space 122*b* and the plug unit 18*b* is unlocked and can be pulled out from the plug socket contrary to the plug-in direction 20*b*.

FIG. 12 shows a further exemplary embodiment of a plug 80*c* in a schematic cross-sectional representation through a plug unit 18*c* and a plug shielding unit 94*c* of the plug 80*c*. The plug 80*c* differs from the plug 80*b* of the preceding exemplary embodiment basically in regard to a latch element 114*c* of a plug shielding unit 94*c*. Otherwise, one can refer to the above descriptions of the plug 80*a* and 80*b*. The latch element 114*c* comprises an actuating tab 118*c* and a latching tab 120*c*. The actuating tab 118*c* and the latching tab 120*c* interact at least for an unlocking. The latch element 114*c* comprises a latch hook 138*c*. By contrast with the preceding exemplary embodiment, the latch hook 138*c* is not offset to the side relative to the latching tab 120*c* in a plug-in direction 20*c*, but instead extends over the entire width of the latch element 114*c* perpendicular to the plug-in direction 20*c*. The actuating tab 118*c* and the latching tab 120*c* likewise extend over the entire width of the latch element 114*c* perpendicular to the plug-in direction 20*c*, so that a force impact area 150*c* along which the actuating tab 118*c* contacts the latching tab 120*c* in form-fit and/or force-locking manner is greater than the force impact area 150*b* of the preceding exemplary embodiment. Thus, a more efficient force transmission from the actuating tab 118*c* to the latching tab 120*c* can be achieved.

FIG. 13 shows a further exemplary embodiment of a plug 80*d* in a schematic cross-sectional representation through a plug unit 18*d* and a plug shielding unit 94*d* of the plug 80*d*. The plug 80*d* differs from the plugs 80*b* and 80*c* of the preceding exemplary embodiments basically in regard to a latch element 114*d* of a plug shielding unit 94*d*. Otherwise, one can refer to the above descriptions of the plugs 80*a* and 80*b*. The latch element 114*d* comprises an actuating tab 118*d* and a latching tab 120*d*, which interact at least for an unlocking. The latch element 114*d* comprises a latch hook 138*d* and a further latch hook 140*d*. Looking along a plug-in direction 20*d*, the latch hook 138*d* and the further latch hook 140*d* are arranged with an offset relative to each other. The latching tab 120*d* is arranged with the latch hook 138*d* and the further latch hook 140*d* and extends beneath the latch hook 138*d* and the further latch hook 140*d* across a gap, the width of which corresponds to the spacing between the latch hook 138*d* and the further latch hook 140*d*. By contrast with the previous exemplary embodiments of FIGS. 11 and 12, a more uniform force transmission is possible by means of the latch element 114*d* during the unlocking and thus a more reliable unlocking is achieved.

FIG. 14 shows a further exemplary embodiment of a plug 80*e* in a schematic cross-sectional representation through a plug unit 18*e* and a plug shielding unit 94*e* of the plug 80*e*. The plug 80*e* differs from the plugs 80*b* to 80*d* of the preceding exemplary embodiments basically in regard to a latch element 114*e* of the plug shielding unit 94*e*. Otherwise, one can refer to the above descriptions of the plug 80*a* and 80*b*. The latch element 114*e* comprises an actuating tab 118*e* and a latching tab 120*e*, which interact at least for an unlocking. The latch element 114*e* comprises a latch hook

138*e*. By contrast with the exemplary embodiments of FIGS. 11 to 13, the latch hook 138*e* is oriented perpendicular to the latching tab 120*e*. The latching tab 120*e* and the actuating tab 118*e* extend across the entire width of the latch element 114*e*, so that a force impact area 150*e* is enlarged, similar to the exemplary embodiment of FIG. 12, and a force transmission from the actuating tab 118*e* to the latching tab 120*e* is especially efficient.

FIG. 15 shows a further exemplary embodiment of a plug 80*f*. The plug 80*f* differs from the preceding exemplary embodiments solely in regard to the configuration of a coding element 112*f* for connection to a cable kink protection 106*f* of the plug 80*f*. The plug 80*f* can otherwise be configured basically according to one of the configurations described above for the plugs 80*a* to 80*e*. By contrast with the coding element 112*a* of the plug 80*a* shown in FIG. 7, the coding element 112*f* has two slender grab hooks 130*f*, which are arranged with an offset from each other along a plug-in direction 20*f* in a connected state to the cable kink protection 106*f*. In this way, a space saving can be advantageously achieved in arrangements with multiple plugs 80*f* arranged alongside each other and perpendicular to the plug-in direction 20*f*. Since the grab hooks 130*f* of the coding element 112*f* are offset from each other in the plug-in direction 20*f*, multiple plugs 80*f* can be placed more closely together, each time separated by a wall thickness of a grab hook 130*f*, as compared to an arrangement with multiple plugs 80*f* each having one coding element 112*f*.

FIG. 16 shows a further exemplary embodiment of a plug 80*g*. The plug 80*g* differs from the preceding exemplary embodiments solely in regard to the configuration of a coding element 112*g* for connection to a cable kink protection 106*g* of the plug 80*g*. The plug 80*g* can otherwise be configured basically according to one of the configurations described above for the plugs 80*a* to 80*e*. By contrast with the coding elements 112*a* and 112*f* shown in FIGS. 7 and 15, the coding element 112*g* of the plug 80*g* is formed without pins. Furthermore, the coding element 112*g* is connected to a connection element 110*g* of the cable kink protection 106*g* not from an underside, but instead laterally. The coding element 112*g* comprises an upper grab hook 140*g* and a lower grab hook 142*g*, which are arranged opposite each other in regard to an opening 132*g* of the coding element 112*g*. In a connected state of the coding element 112*g*, the width 136*g* of the cable kink protection 106*g* is exceeded neither by the upper grab hook 140*g* nor by the lower grab hook 142*g*. Thus, a space saving can advantageously be further increased in arrangements with multiple plugs 80*g* alongside each other as compared to the coding element 112*f* of the previous exemplary embodiment.

FIG. 17 shows a further exemplary embodiment of a plug 80*h*. The plug 80*h* differs from the preceding exemplary embodiments solely in regard to the configuration of a coding element 112*h* for connection to a cable kink protection 106*h* of the plug 80*h*. The plug 80*h* can otherwise be configured basically according to one of the configurations described above for the plugs 80*a* to 80*e*. By contrast with the coding element 112*g* of the preceding exemplary embodiment, an upper grab hook 140*h* and a lower grab hook 142*h* of the coding element 112*h* each have a lesser extension in the longitudinal direction. Thus, the coding element 112*h* in a state connected to the cable kink protection 106*h* has overall a lesser extension in the longitudinal direction parallel to a plug-in direction 20*h* of the plug 80*h*. Accordingly, a connection element 110*h* of the cable kink protection 106*h* for connection to the coding element 112*h* is also shorter in the longitudinal direction parallel to the plug-in direction 20*h* of the plug 80*h* as compared to the preceding exemplary embodiments, so that advantageously a space saving can be achieved in the plug-in direction 20*h*.

REFERENCE NUMBERS

10 Plug socket
12 Plug socket unit
14 Front side
16 Plug opening
18 Plug unit
20 Plug-in direction
22 Fiber optic unit
24 Optical fiber
26 Rear side
28 Underside
30 Pass-through opening
32 Connection element
34 Catch element
36 Connection unit
38 Deflection region
40 Further optical fiber
42 Connection web
44 Plug socket shielding unit
46 Plug socket subunit
48 Further plug socket subunit
50 Further plug opening
52 Further plug-in direction
54 Inner shielding element
56 Shielding opening
58 Outer shielding element
60 Outer side
62 Recess
64 Plug connector system
66 Plug socket kit
68 Further pass-through opening
70 Further recess
72 First step of the method
74 Second step of the method
76 Further deflection region
78 Further connection element
80 Plug
82 Wiring block
84 Cable
86 Conductor core
88 Further conductor core
90 Assembly direction
92 Receiving space
94 Plug shielding unit
96 Plug shielding element
98 Plug shielding flap
100 Pivot axis
102 Contacting tab
104 Further contacting tab
106 Cable kink protection
108 Circumferential direction
110 Connection element
112 Coding element
114 Latch element
116 Actuating element
118 Actuating tab
120 Latching tab
122 Latch receiving space
124 Plug kit
126 Step of the method
128 Further step of the method
130 Grab hook

132 Opening
134 Pin
136 Width
138 Latch hook
140 Further latch hook
142 Lower grab hook
144 Flexible region
146 Locking element
148 Unlocking element
150 Force impact area

The invention claimed is:

1. A plug, in particular a single-pair ethernet plug, having a plug unit for plugging into a corresponding plug socket unit along a plug-in direction, having a plug shielding unit, which in an assembled state surrounds the plug unit at least section-wise and having a wiring block for receiving two conductor cores of a cable, wherein the wiring block is in the assembled state connected to the plug unit along an assembly direction, which is perpendicular to the plug-in direction, wherein the plug shielding unit comprises a plug shielding element and a plug shielding flap which is pivotably connected to the plug shielding element and which is pivotable relative to the plug shielding element around a pivot axis running parallel to the plug-in direction.

2. The plug as claimed in claim 1, wherein the plug unit has a receiving space for receiving the wiring block, which is open contrary to the assembly direction and contrary to the plug-in direction.

3. The plug as claimed in claim 1, wherein the wiring block is in the assembled state situated at least to a large extent inside the plug unit.

4. The plug as claimed in claim 1, wherein in the assembled state the plug shielding element and the plug shielding flap are snapped together with each other and/or with a plug housing of the plug unit.

5. The plug as claimed in claim 1, wherein the plug shielding unit comprises two contacting tabs, which are provided for engaging around the cable and for crimping.

6. The plug at least as claimed in claim 1, comprising a cable kink protection, which is at least substantially closed in a circumferential direction with respect to the plug-in direction and which ensures a connection of the wiring block to the plug unit and in particular a connection of the plug shielding unit to the plug unit.

7. The plug as claimed in claim 6, wherein the cable kink protection comprises at least one connection element for a connection to a coding element.

8. The plug as claimed in claim 1, comprising a plug shielding unit, which comprises a latch element for locking the plug unit with the plug socket unit and comprises an actuating element for unlocking the latch element, wherein the actuating element comprises an actuating tab and the latch element comprises a latching tab, which interact at least for an unlocking.

9. The plug as claimed in claim 8, wherein the actuating tab is oriented parallel to the plug-in direction and the latching tab is oriented antiparallel to the plug-in direction.

10. The plug as claimed in claim 8, wherein the plug unit has a latch receiving space for receiving the latch element at least during the unlocking.

11. A plug connector system, having at least one plug as claimed in claim 1 and having at least one plug socket, which comprises the corresponding plug socket unit.

12. A plug kit for the field termination of a plug as claimed in claim 8, having the plug unit, the wiring block and the plug shielding unit.

13. A method for field termination of a cable with a plug by means of a plug kit as claimed in claim 12, wherein the cable is connected to the wiring block and the wiring block is then connected to the plug unit along the assembly direction, which is perpendicular to the plug-in direction.

14. A plug, in particular a single-pair ethernet plug, having a plug unit for plugging into a corresponding plug socket unit along a plug-in direction and having a wiring block for receiving two conductor cores of a cable, comprising a plug shielding unit, which comprises a latch element for locking the plug unit with the plug socket unit and comprises an actuating element for unlocking the latch element, wherein the actuating element comprises an actuating tab and the latch element comprises a latching tab, which interact at least for an unlocking.

* * * * *